(12) United States Patent
Nakagawa et al.

(10) Patent No.: US 10,454,704 B1
(45) Date of Patent: Oct. 22, 2019

(54) NETWORK NODE, NETWORK COMMUNICATION SYSTEM, AND NETWORK COMMUNICATION METHOD

(71) Applicant: Yazaki Corporation, Tokyo (JP)

(72) Inventors: Satoshi Nakagawa, Shizuoka (JP); Terumitsu Sugimoto, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/364,817

(22) Filed: Mar. 26, 2019

(30) Foreign Application Priority Data

Mar. 27, 2018 (JP) .................................. 2018-060416

(51) Int. Cl.
- *H04L 7/00* (2006.01)
- *H04L 12/40* (2006.01)
- *H04B 1/3822* (2015.01)

(52) U.S. Cl.
CPC ..... *H04L 12/40019* (2013.01); *H04B 1/3822* (2013.01); *H04L 7/0012* (2013.01); *H04L 7/0037* (2013.01)

(58) Field of Classification Search
CPC ........................... H04L 7/0037; H04L 7/0041
See application file for complete search history.

(56) References Cited

U.S. PATENT DOCUMENTS

| 5,398,048 A * | 3/1995 | O'Mahony | G09G 1/285 345/212 |
| 2005/0008010 A1 * | 1/2005 | Reed | H04L 12/56 370/360 |
| 2017/0118816 A1 | 4/2017 | Ohashi et al. | |

FOREIGN PATENT DOCUMENTS

| EP | 2381627 A1 | 10/2011 |
| JP | 2017-084573 A | 5/2017 |

* cited by examiner

*Primary Examiner* — Farley Abad
(74) *Attorney, Agent, or Firm* — Sughrue Mion, PLLC

(57) ABSTRACT

In network communication system, a master unit's controller transmits a command signal to a CXPI bus. The controller specifies values of turning-on intervals of loads as delay time lengths in a delay area of the command signal, and specifies ports of slave units in an output port specification area in a specified order corresponding to turning-on order of the loads. The microcomputer of each slave unit receives the command signal from the CXPI bus. The microcomputer acquires a specified number of a port of the own slave unit specified as an instruction target in the output port specification area, integrates specified values in the delay area, and outputs the operation signal to the specified port at a timing delayed from the reception of the command signal by the time length calculated by the integration. The number of specified values is a number obtained by subtracting 1 from the specified number.

5 Claims, 6 Drawing Sheets

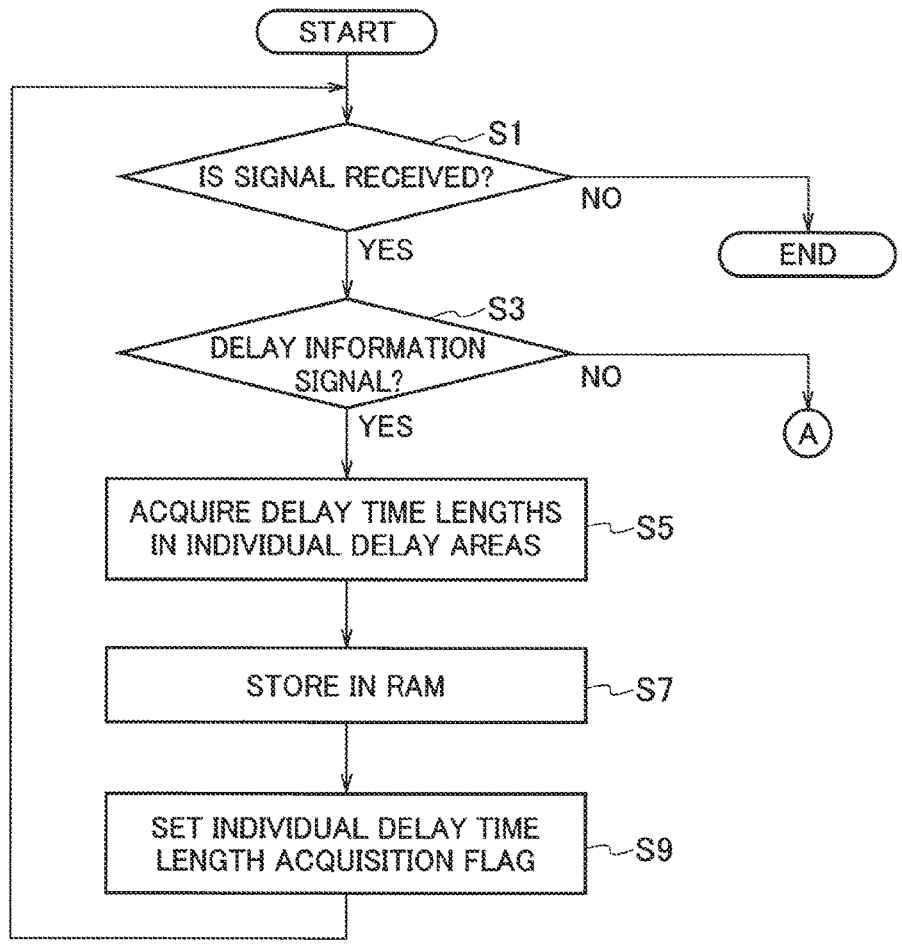

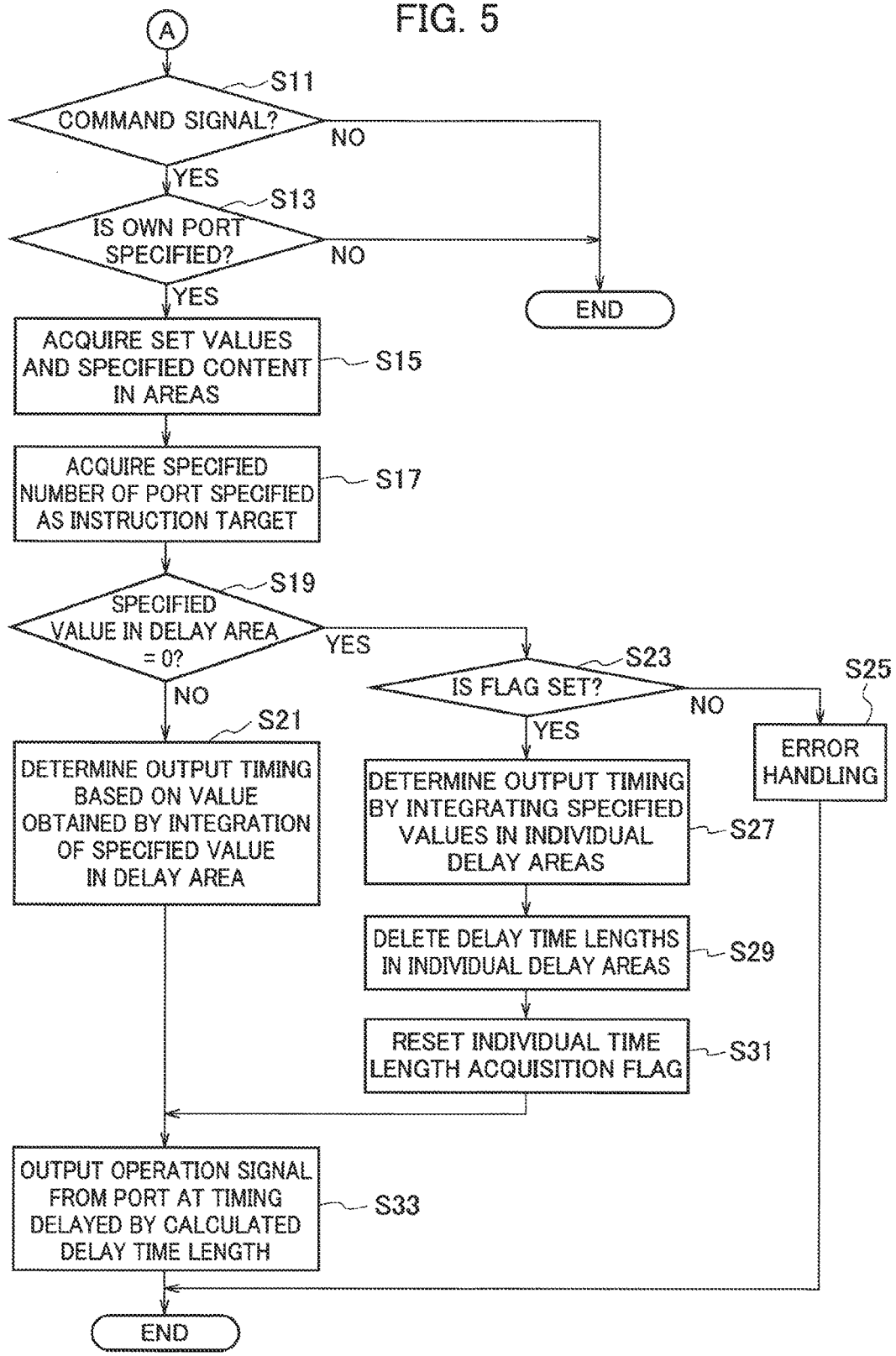

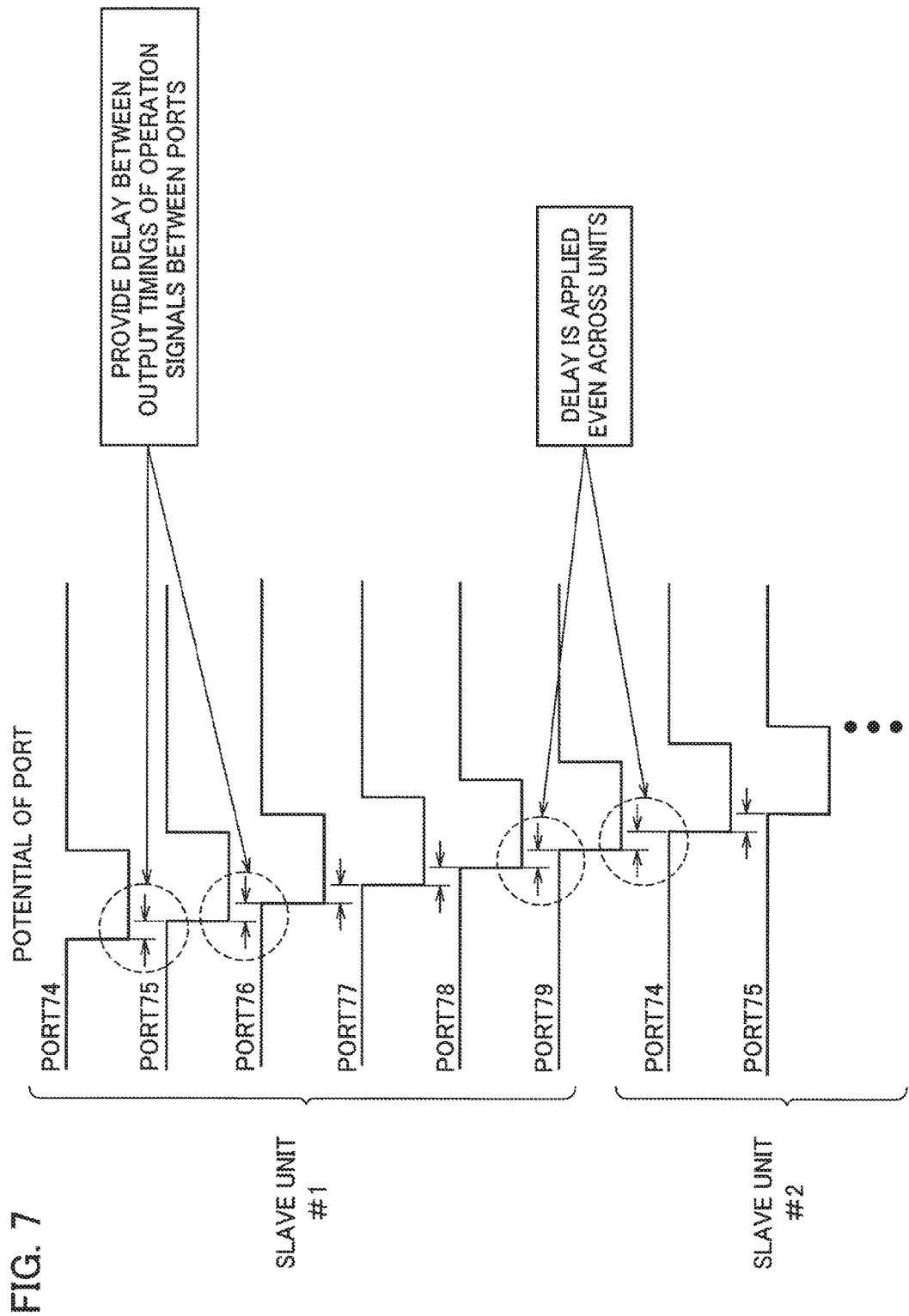

NETWORK NODE, NETWORK COMMUNICATION SYSTEM, AND NETWORK COMMUNICATION METHOD

CROSS REFERENCE TO RELATED APPLICATION

The present application is based on, and claims priority from Japanese Patent Application No. 2018-060416, filed Mar. 27, 2018, the disclosure of which is hereby incorporated by reference herein in its entirety.

TECHNICAL FIELD

The present application relates to a technique for transmitting and receiving a command signal for operating loads over a network.

BACKGROUND ART

When a load mounted on a vehicle is operated, a command signal is transmitted from a higher-level controller that controls the operation of the load to a lower-level controller that actually operates the load via a network in the vehicle. At this time, when a plurality of loads is operated at different timings, for each load, a command signal corresponding to the operation timing of the load is transmitted from the upper controller to the lower-level controller.

For example, when ten LED devices mounted on a vehicle as lighting devices in the interior of the vehicle are caused to emit light in white at a little intervals, ten kinds of command signals corresponding to light emission patterns of the LED devices are transmitted from the higher-level controller to the lower-level controller that operates each LED device via the network inside the vehicle (see JP 2017-084573 A (patent family: US 2017/0118816 A1)).

SUMMARY

In recent vehicles, a plurality of types of networks with different communication speeds (communication capacity) are mounted, and a network is properly selected and used depending on the degree of importance of a content to be transmitted and a required speed of response. Therefore, for example, a network having a relatively low communication speed (communication capacity) is used for transmission of a signal having a low direct relevance to safe operation of the vehicle and transmission of a signal not requiring an immediate response.

Therefore, if command signals for the LED devices are transmitted from the higher-level controller to the lower-level controller using a network with a relatively low communication speed (communication capacity) in order to make the plurality of LED devices sequentially emit light at a little intervals, the transmission intervals between the command signals to be transmitted successively cannot be made less than an upper limit. Therefore, the LED devices can be made to sequentially emit light only with a time difference of a certain time or more, restricting the light emission pattern of the plurality of LED devices.

The present application has been made in view of the above circumstances, and an object of the present application is to provide a network node, a network communication system, and a network communication method allowing a node as a transmission source to transmit command signals for sequentially operating a plurality of loads with a short time difference even when a network having a relatively low communication speed (communication capacity) is used.

A network node according to a first aspect of the present application includes a distinguishing unit configured to distinguish whether or not an own output port is specified as an instruction target in a command signal received from a network, a specified number acquisition unit configured to acquire, from the command signal, a specified number in a specified order, in the command signal, of the own output port distinguished by the distinguishing unit as the instruction target specified in the command signal, a delay information acquisition unit configured to acquire delay information on a delay time length of an output timing of an operation signal for a load connected to the output port that is the instruction target from the command signal, in which the distinguishing unit has distinguished that the own output port is specified as the instruction target, a determination unit configured to determine a timing at which the operation signal is output to the load from the own output port based on a reception timing of the command signal, in which the distinguishing unit has distinguished that the own output port is specified as the instruction target, from the network, the specified number acquired by the specified number acquisition unit, and the delay information acquired by the delay information acquisition unit, and an output unit configured to output the operation signal to the load from the own output port at the timing determined by the determination unit.

With the network node according to the first aspect of the present application, in a case where the distinguishing unit distinguishes that an own output port is specified as an instruction target in the command signal received from the network, the specified number acquisition unit acquires a specified number of the own output port as an instruction target in the received command signal.

The determination unit then determines a time length to be delayed from the reception of the command signal to output an operation signal, that is, an output timing of the operation signal based on the reception timing of the command signal from the network, the delay information acquired by the delay information acquisition unit, and the specified number of the own output port as an instruction target acquired by the specified number acquisition unit.

Note that the determination unit may determine the time length to be delayed from the reception of the command signal to output an operation signal by integrating the delay time length of an output timing of an operation signal calculated based on the delay information acquired from the received command signal by the delay information acquisition unit for the number of times corresponding to the specified number of the own output port as an instruction target acquired by the specified number acquisition unit.

Thus, the operation signal is output from the own output port distinguished by the distinguishing unit as an instruction target specified in the received command signal to the load at the timing determined by the determination unit.

Therefore, when a plurality of output ports are specified as instruction targets in one command signal, the output timings of the operation signals determined by the determination unit differ corresponding to the difference in the number specified as an instruction target in the received command signal.

That is, by using only one command signal, it is possible to sequentially output the operation signals to the loads by delaying the timings from the plurality of output ports that are instruction targets in the order specified as the instruction targets. Further, the time differences between the timings at which the output ports output the operation signals can be determined by the delay time lengths calculated based on the delay information of the command signal irrespective of the communication speed (communication capacity) of the network.

Therefore, even when a network having a relatively low communication speed (communication capacity) is used, it is possible to realize network communication capable of transmitting a command signal for sequentially operating the plurality of loads with a short time difference from the node as a transmission source.

The specified number acquisition unit may acquire, from the command signal specifying a plurality of output ports including an output port of another network node as instruction targets, the specified number of the own output port in the specified order.

With this configuration, specified numbers of the output ports that are instruction targets in the command signal are serial numbers through all the output ports specified as the instruction targets regardless whether the same network node or different network nodes include the output ports.

Therefore, even if the output ports specified as instruction targets in the command signal include an output port of a different network node, it is possible to output the operation signals sequentially by delaying timings from the plurality of output ports to the loads.

The network node according to the first aspect of the present application may further include an individual information acquisition unit configured to acquire, from a delay information signal including identification information of the delay information in header information out of signals received from the network, individual delay information defining, as delay time lengths, differences between output timings of operation signals from two output ports specified successively out of a plurality of output ports specified as instruction targets in the command signal in the specified order of the instruction targets. In this case, the distinguishing unit uses a signal including identification information of the command signal in the header information received after the delay information signal from the network to distinguish whether or not the own output port is specified as an instruction target in the command signal, and in a case where the delay information acquired from the command signal by the delay information acquisition unit indicates reference of the individual delay information, the determination unit determines a timing at which the operation signal is output to the load from the own output port using, as the delay information acquired by the delay information acquisition unit, differences between output timings of the operation signals defined at specified numbers that are former compared with the specified number acquired by the specified number acquisition unit in the individual delay information acquired, by the individual information acquisition unit, from the delay information signal having been received from the network before the command signal.

With this configuration, when a delay information signal including identification information of delay information in the header information is received from the network, the individual delay information is acquired from the delay information signal by the individual information acquisition unit.

Individual delay information acquired from the delay information signal by the individual information acquisition unit defines, as delay time lengths, differences between output timings of operation signals from two output ports specified successively out of a plurality of output ports specified as instruction targets in the command signal. In the individual delay information, the differences between output timings of operation signals from two output ports specified successively are defined in the specified order of the instruction targets in the command signal.

When a command signal including identification information of the command signal in the header information is received from the network after the delay information signal, whether or not the own output port is specified as an instruction target in the command signal is distinguished by the distinguishing unit. In a case where the distinguishing unit distinguishes that an own output port is specified as an instruction target in the command signal received from the network, the specified number acquisition unit acquires a specified number of the own output port as an instruction target in the received command signal, and the delay information acquisition unit acquires delay information from the received command signal.

Here, if the delay information acquired from the received command signal by the delay information acquisition unit relates to the delay time length of the output timing of the operation signal to the load connected to the output port that is an instruction target, the determination unit determines a time length to be delayed from the reception of the command signal to output the operation signal based on the delay information acquired from the received command signal by the delay information acquisition unit and the specified number of the own output port as an instruction target acquired by the specified number acquisition unit.

On the other hand, if the delay information acquired from the received command signal by the delay information acquisition unit indicates reference of the individual delay information of the delay information signal, the determination unit determines a time length to be delayed from the reception of the command signal to output the operation signal based on the individual delay information acquired, by the individual information acquisition unit, from the delay information signal having been received from the network before the command signal and the specified number of the own output port as an instruction target acquired by the specified number acquisition unit.

Note that the determination unit determines a time length from the reception timing of the command signal to a timing at which the operation signal is output to the load from the own output port using, as the delay information acquired by the delay information acquisition unit, differences of output timings of the operation signals defined between two output ports at successive specified numbers that are former compared with the specified number acquired by the specified number acquisition unit in the individual delay information acquired, by the individual information acquisition unit, from the delay information signal having been received from the network before the command signal.

That is, the determination unit determines a timing at which the operation signal is output to the load from the own output port by integrating differences of output timings of the operation signals defined between two output ports at successive specified numbers that are former compared with the specified number acquired by the specified number acquisition unit in the individual delay information acquired, by the individual information acquisition unit, from the received delay information signal.

Therefore, the output timing of the operation signal to a load from an output port specified as an instruction target in the received command signal can be set by individually setting a delay time length from an output timing of an operation signal from an output port specified previously as an instruction target to a load rather than setting constant delay time lengths.

A network communication system according to a second aspect of the present application includes a master node configured to specify, as instruction targets, output ports to output operation signals to loads at different timings in an order from an output port having an earlier output timing of an operation signal and transmit a command signal to a network, the command signal including delay information related to delay time lengths of output timings of the operation signals to the loads connected to the output ports that are the instruction targets from the output ports, and a slave node configured to receive the command signal from the network, wherein the network node according to the first aspect of the present application is used as the slave node.

With the network communication system according to the second aspect of the present application, the network node according to the first aspect of the present application is used as a slave node that receives, from the network, the command signal transmitted by the master node, and thus the effect obtained by the network node according to the first aspect of the present application can be obtained.

A network communication method according to a third aspect of the present application includes a transmission step, performed by a master node, of transmitting a command signal to a network, the command signal including, in a frame, an instruction target field in which output ports to output operation signals to loads at different timings are specified as instruction targets in an order from an output port having an earlier output timing of an operation signal and a delay information field in which delay information related to delay time lengths of output timings of the operation signals to the loads connected to the output ports that are instruction targets from the output ports is set, a distinguishing step, performed by a slave node, of distinguishing whether or not an own output port is specified as one of the instruction targets in the instruction target field of the command signal received from a network, a specified number acquisition step, performed by the slave node, of acquiring a specified number in a specified order of the own output port in the instruction target field of the command signal, the own output port having been distinguished in the distinguishing step as an output port specified as one of the instruction targets in the instruction target field of the command signal, a delay information acquisition step, performed by the slave node, of acquiring the delay information from the delay information field of the command signal for which it has been distinguished in the distinguishing step that the own output port is specified as one of the instruction targets, a determination step, performed by the slave node, of determining a timing for outputting the operation signal to the load from the own output port based on reception timing, from the network, of the command signal for which it has been distinguished in the distinguishing step that the own output port is specified as one of the instruction targets, the specified number acquired in the specified number acquisition step, and the delay information acquired in the delay information acquisition step, and an output step, performed by the slave node, of outputting the operation signal to the load from the own output port at the timing determined in the determination step.

According to the network communication method according to the third aspect of the present application, when the master node specifies, as instruction targets, output ports to output operation signals to loads at different timings in an order from an output port having an earlier output timing of an operation signal in an instruction target field and transmits a command signal to a network, the command signal including delay information related to delay time lengths of output timings of the operation signals set in a delay information field to the loads connected to the output ports that are the instruction targets from the output ports, the slave node performs the steps similar to the steps of the procedure performed by the network node according to the first aspect of the present application.

Therefore, similarly to the effect obtained by the network node according to the first aspect of the present application, even when a network having a relatively low communication speed (communication capacity) is used, it is possible to realize network communication capable of transmitting a command signal for sequentially operating the plurality of loads with a short time difference from the node as a transmission source.

According to each aspect of the present application, even when a network having a relatively low communication speed (communication capacity) is used, it is possible to realize network communication capable of transmitting a command signal for sequentially operating the plurality of loads with a short time difference from the node as a transmission source.

BRIEF DESCRIPTION OF THE DRAWINGS

FIG. 3A is an explanatory diagram of a frame structure of a command signal transmitted by the master unit of FIG. 1 to a CXPI bus, and FIG. 3B is an explanatory diagram of a frame structure of a delay information signal transmitted by the master unit of FIG. 1 to the CXPI bus.

FIG. 4 is a flowchart illustrating a procedure of processing for outputting an operation signal to the load performed by a CPU of a microcomputer of each slave unit of FIG. 1 according to a program stored in a ROM.

FIG. 5 is a flowchart illustrating a procedure of processing for outputting an operation signal to the load performed by the CPU of the microcomputer of each slave unit of FIG. 1 according to a program stored in the ROM.

FIG. 7 is a timing chart illustrating variation of potentials of the ports when the CPU of the microcomputer of each slave unit of FIG. 1 that has received the command signal of FIG. 3A outputs the operation signals from the ports at constant intervals.

DETAILED DESCRIPTION

Figure 1:
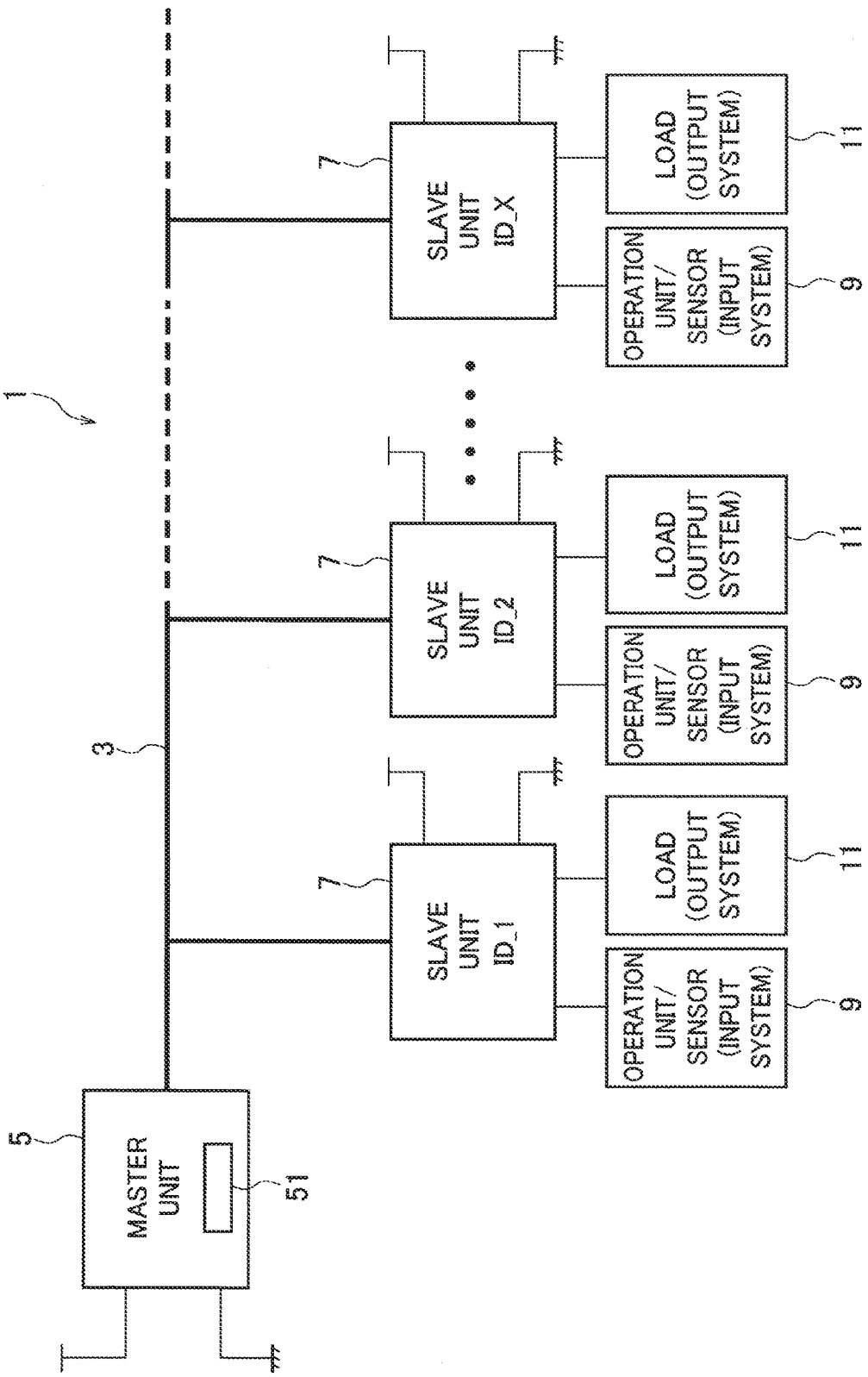
FIG. 1 is an explanatory diagram illustrating a schematic configuration of an in-vehicle LAN system, which is a network communication system according to an embodiment.

Hereinafter, an embodiment will be described with reference to the drawings. FIG. 1 is an explanatory diagram illustrating a schematic configuration of an in-vehicle LAN system 1, which is a network communication system according to the embodiment.

The in-vehicle LAN system 1 is a LAN system conforming to the Clock Extension Peripheral Interface (CXPI)

standard. The in-vehicle LAN system 1 is mounted on a vehicle as a lower level network of a higher-level LAN system conforming to the Controller Area Network (CAN) standard (not illustrated) together with the LAN system conforming to the CAN standard.

The higher-level LAN system conforming to the CAN standard is mainly used for communication of signals such as a detection signal of an operation unit related to a traveling system including an engine, a motor, and the like, which is a core of a vehicle, a control signal of a load, and the like. On the other hand, the in-vehicle LAN system 1, which is the lower-level LAN system conforming to the CXPI standard, is used for communication of signals such as a detection signal of an operation unit related to an equipment system (wiper, light), which has been directly connected (direct line connection) by a wire harness, a control signal of a load, and the like.

The in-vehicle LAN system 1 illustrated in FIG. 1 includes a CXPI bus 3 conforming to the CXPI standard as a network. To the CXPI bus 3, a master unit 5 as a master node and a plurality of slave units 7 as slave nodes are connected.

The master unit 5 is also connected to a network (not illustrated) of the LAN system conforming to the CAN standard that is at a higher level than the in-vehicle LAN system 1. The master unit 5 includes a controller 51 that functions as a CAN controller. The controller 51 transmits a command signal for instructing each of the slave units 7 to output an operation signal for operating a load of the equipment system and the like to the CXPI bus 3 directed to the slave unit 7.

Each of the slave units 7 includes a microcomputer 71 and an input/output (I/O) interface 73. The microcomputer 71 receives a signal transmitted to the CXPI bus 3 and performs processing corresponding to the content of the signal. The input/output interface 73 has a plurality of ports. To each of the ports, an operation unit/sensor (input system) 9 and a load (output system) 11 of the equipment system arranged in the vicinity of each of the slave units 7 are connected.

When operating the load 11 connected to each of the slave units 7, the controller 51 of the master unit 5 transmits a signal to the CXPI bus 3.

On the other hand, the microcomputer 71 of each of the slave units 7 receives a signal, which has been transmitted to the CXPI bus 3 by the controller 51 of the master unit 5 of FIG. 1, from the CXPI bus 3. In addition, the microcomputer 71 of each of the slave units 7 outputs an operation signal to the load 11 connected to each of the ports (output ports) 74-79 of the input/output interfaces 73 corresponding to the content of the signal received from the CXPI bus 3 as needed.

Figure 2:
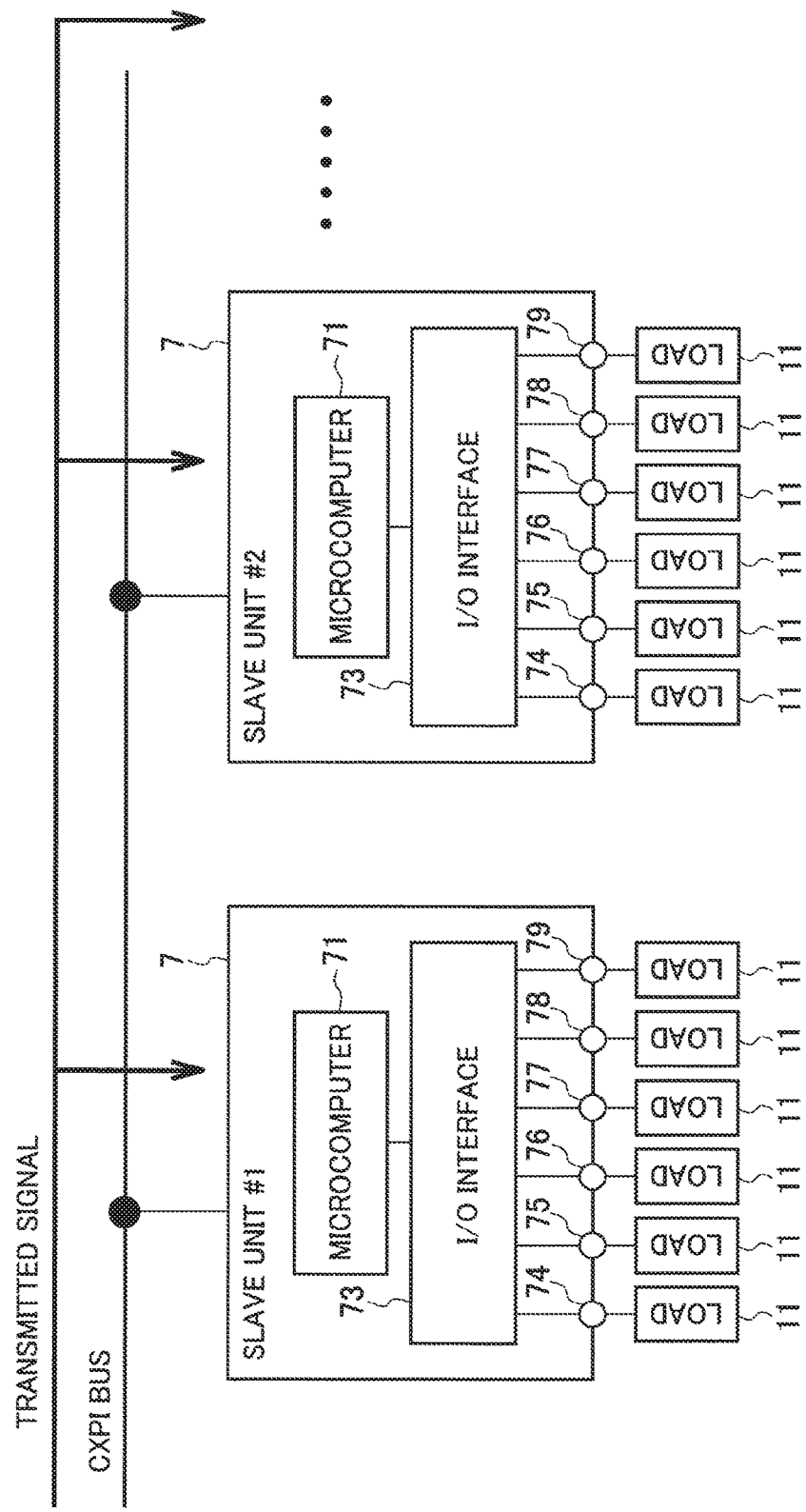
FIG. 2 is an explanatory diagram illustrating a state where each slave unit of FIG. 1 outputs an operation signal to a load connected to each port corresponding to a command signal from a master unit.

FIG. 2 is an explanatory diagram illustrating a state where the microcomputer 71 of each of the slave units 7 outputs an operation signal to the load 11 connected to each of the ports 74-79 of the input/output interface 73 as needed corresponding to a signal from the master unit 5.

Here, a frame structure of a signal transmitted to the CXPI bus 3 by the controller 51 of the master unit 5 will be described with reference to FIGS. 3A and 3B.

In the following description, it is assumed that the load 11 is an illumination light source for illuminating the interior of the vehicle, and the microcomputer 71 outputs operation signals to the loads 11 to be turned on in order to turn on the plurality of loads 11. In addition, in the following description, it is assumed that the plurality of loads 11 is turned on at different timings with a time difference therebetween.

First, FIG. 3A is an explanatory diagram illustrating a frame structure of a command signal transmitted to the CXPI bus 3 by the controller 51 of the master unit 5. The command signal is a signal that is transmitted from the microcomputer 71 of each of the slave units 7 to instruct the microcomputer 71 to output operation signals for turning on the loads 11 connected to the slave unit 7 to the loads 11.

As illustrated in FIG. 3A, the frame of the command signal has a header area, a DUTY value area, a fade time area, a delay area, and an output port specification area.

The header area is used to set identification information of the command signal. The DUTY value area is used to set a value of the duty ratio corresponding to the brightness when the load 11 is turned on. The fade time area is used to set a fade time spent for transition from the light-off state to the light-on state when the load 11 is turned on. The delay area will be described later.

The output port specification area is used to specify the ports 74-79 as instruction targets by the input/output interface 73. To the ports 74-79, the loads 11, to which operation signals are output, are connected.

In the in-vehicle LAN system 1 according to the embodiment, the plurality of slave units 7 is connected to the CXPI bus 3. Therefore, it is necessary to distinguish each of the slave units 7 and specify each of the ports 74-79. Therefore, in the embodiment, identification numbers that are serial numbers assigned to the ports 74-79 of the input/output interfaces 73 of all the slave units 7 connected to the CXPI bus 3 are used to specify a port 74-79 of any of the slave units 7 as an instruction target.

In the output port specification area, the ports 74-79 of the slave units 7 that are instruction targets are specified in an order from a port to turn on the load 11 at the earliest timing.

The delay area is used to specify a difference (delay time length) between output timings of operation signals to be output from two of the ports 74-79 of the slave unit 7 that are instruction targets specified successively when operation signals for the loads 11 are sequentially output from the ports 74-79 of the slave units 7 in the order specified as the instruction targets in the output port specification area.

For example, when a specified value in the delay area is "100", 100 ms is specified as the delay time length. When a specified value in the delay area is "0", this means that time lengths specified individually for the instruction targets in the specified order in a delay information signal to be described below is specified as delay time lengths.

Next, FIG. 3B is an explanatory diagram illustrating a frame structure of the delay information signal transmitted to the CXPI bus 3 by the controller 51 of the master unit 5 as needed. The delay information signal is a signal for specifying differences (delay time lengths) between output timings of operation signals to be output from two of the ports 74-79 of the slave unit 7 that are instruction targets specified successively in further detail than that can be specified in the delay area of the command signal of FIG. 3A when operation signals for the loads 11 are sequentially output from the ports 74-79 of the slave units 7 in the order specified as the instruction targets in the command signal.

As illustrated in FIG. 3B, the frame of the delay information signal includes a header area and a plurality of individual delay areas. The header area is used to set identification information of the delay information signal.

The individual delay area is used to individually specify a difference (delay time length) between output timings of operation signals to be output from two of the ports 74-79 of the slave unit 7 that are instruction targets specified successively for each pair of ports when operation signals for the loads 11 are sequentially output from the ports 74-79 of the slave units 7 in the order specified as the instruction targets in the command signal of FIG. 3A.

Therefore, the number of individual delay areas included in the delay information signal is one fewer (n−1) than the number (n) of the ports 74-79 of the slave unit 7 that are instruction targets.

For example, in the first individual delay area, a time difference (delay time length) between output timings of operation signals for the loads 11 to be output from two of the ports 74-79 of the slave unit 7 that are instruction targets specified first and second as the instruction targets. Further, in the (n−1)-th individual delay area, a time difference (delay time length) between output timings of operation signals for the loads 11 to be output from two of the ports 74-79 of the slave unit 7 that are instruction targets specified (n−1)-th and n-th as the instruction targets.

More specifically, in a case where, for example, the time differences are gradually decreased in turning on of the loads 11 sequentially, the delay time lengths specified in the individual delay areas are gradually decreased from the first delay area toward the last delay area. On the contrary, in a case where, for example, the time differences are gradually increased in turning on of the loads 11 sequentially, the delay time lengths specified in the individual delay areas are gradually increased from the first delay area toward the last delay area.

In a case where the plurality of loads 11 is sequentially turned on at constant intervals, that is a delay time length, the controller 51 of the master unit 5 transmits only the command signal having a value other than "0" as the specified value in the delay area of FIG. 3A to the CXPI bus 3.

In a case where the plurality of loads 11 is sequentially turned on with individual specification of time differences (delay time lengths) between turning-on timings of two of the loads 11 to be turned on successively, the controller 51 of the master unit 5 transmits the command signal having a value "0" as the specified value in the delay area of FIG. 3A to the CXPI bus 3. In addition, the controller 51 of the master unit 5 transmits the delay information signal of FIG. 3B having the individual delay areas, the number of which is one fewer than the number of the loads 11 to be sequentially turned on, to the CXPI bus 3 before transmitting the command signal.

Next, with reference to a flowchart of FIGS. 4 and 5, the procedure of processing for outputting the operation signals to the loads 11 performed by a CPU of the microcomputer 71 according to a program stored in a ROM of the microcomputer 71 in each slave unit 7 of the in-vehicle LAN system 1 is described. The CPU of the microcomputer 71 repeats the processing of the procedure illustrated in the flowchart of FIGS. 4 and 5 at predetermined intervals.

First, as illustrated in FIG. 4, the CPU of the microcomputer 71 checks whether or not a signal is received from the CXPI bus 3 (step S1). If the CPU has not received a signal (NO in step S1), the series of processing is terminated.

On the other hand, if the CPU has received a signal (YES in step S1), the CPU checks whether or not the received signal is a delay information signal (step S3). The fact that the received signal is a delay information signal can be confirmed by referencing the identification information in the header area of the received signal.

If the received signal is not a delay information signal (NO in step S3), the processing proceeds to step S11 described later. If the received signal is a delay information signal (YES in step S3), the CPU acquires delay time lengths specified in the individual delay areas of the received delay information signal (step S5).

The CPU stores the acquired delay time lengths in the RAM of the microcomputer 71 (step S7) and sets an individual delay time length acquisition flag in the RAM (step S9), and then the processing returns to step S1.

As illustrated in FIG. 5, in step S11, the CPU of the microcomputer 71 checks whether or not the received signal is a command signal. The fact that the received signal is a command signal can be confirmed by referencing the identification information in the header area of the received signal.

If the received signal is not a command signal (NO in step S11), the series of processing is terminated. If the received signal is a command signal (YES in step S11), the CPU checks whether or not the instruction target specified in the output port specification area of the received command signal includes an identification number of any of the ports 74-79 of the input/output interface 73 of the own slave unit 7 that includes the microcomputer 71 (step S13).

If the instruction target does not include an identification number of any of the ports 74-79 of the own slave unit 7 (NO in step S13), the series of processing is terminated, and if the instruction target includes an identification number of any of the ports 74-79 of the own slave unit 7 (in step S13 YES), the CPU acquires, from the received command signal, set values in the DUTY value area and the fade time area, a specified value in the delay area, and a specified content in the output port specification area (step S15).

The CPU then acquires, from the specified content in the output port specification area, a specified number of the port 74-79 of the own slave unit 7 specified as the instruction target in the specified order (step S17). At this time, if a plurality of ports 74-79 of the own slave unit 7 are specified as the instruction targets, a specified number of each of the specified ports 74-79 in the specified order is acquired.

Next, the CPU checks whether or not the specified value in the delay area acquired from the received command signal is "0" (step S19).

If the specified value in the delay area is not "0" (NO in step S19), the CPU of the microcomputer 71 calculates an output timing of an operation signal from the port 74-79 specified in the command signal as the instruction target by subtracting 1 from the specified number of the port 74-79 specified as the instruction target, and multiplying the value obtained by the subtraction by the specified value in the delay area acquired from the command signal (step S21). The processing then proceeds to step S33 described later.

On the other hand, if the specified value in the delay area is "0" (YES in step S19), the CPU checks whether or not the individual delay time length acquisition flag is set in the RAM (step S23).

If the individual delay time length acquisition flag is not set (NO in step S23), error handling such as retransmission request of the delay information signal and the command signal is performed (step S25), and the series of processing is terminated.

On the other hand, if the individual delay time length acquisition flag is set (YES in step S23), the CPU of the microcomputer 71 calculates a delay time length of each of the ports 74-79 specified as the instruction targets using the delay time lengths between two successive ports of the ports 74-79 specified in the individual delay areas of the delay information signal, which is stored in the RAM (step S27).

More specifically, the CPU acquires delay time lengths specified in the delay information signal from the delay time lengths of the individual delay areas in the delay information signal stored in the RAM for pairs of ports 74-79 specified successively in the specified order as the instruction targets in the command signal from a port specified first to each of the ports 74-79 of the own slave unit 7 in the specified order. The CPU then integrates the acquired delay time lengths to calculate the delay time length for the port 74-79 specified as the instruction target.

Further, the CPU deletes the delay time length of each individual delay area of the delay information signal stored in the RAM (step S29) and resets the individual delay time length acquisition flag having been set in the RAM (step S31), and the processing proceeds to step S33.

In step S33, at the timing delayed from the reception timing of the command signal by the delay time length calculated in step S21 or step S27, operation signals are output from the instruction target ports 74-79 to the loads 11. After that, the series of processing ends.

In the embodiment, step S13 in FIG. 5 performed by the CPU of the microcomputer 71 of the slave unit 7 corresponds to a distinguishing unit.

In addition, in the embodiment, step S17 of FIG. 5 performed by the CPU of the microcomputer 71 of the slave unit 7 corresponds to a specified number acquisition unit, and step S15 of FIG. 5 performed by the CPU of the microcomputer 71 of the slave unit 7 corresponds to a delay information acquisition unit.

Further, in the embodiment, step S5 of FIG. 4 performed by the CPU of the microcomputer 71 of the slave unit 7 corresponds to an individual information acquisition unit, and step S33 of FIG. 5 performed by the CPU of the microcomputer 71 of the slave unit 7 corresponds to a determination unit.

Figure 6:
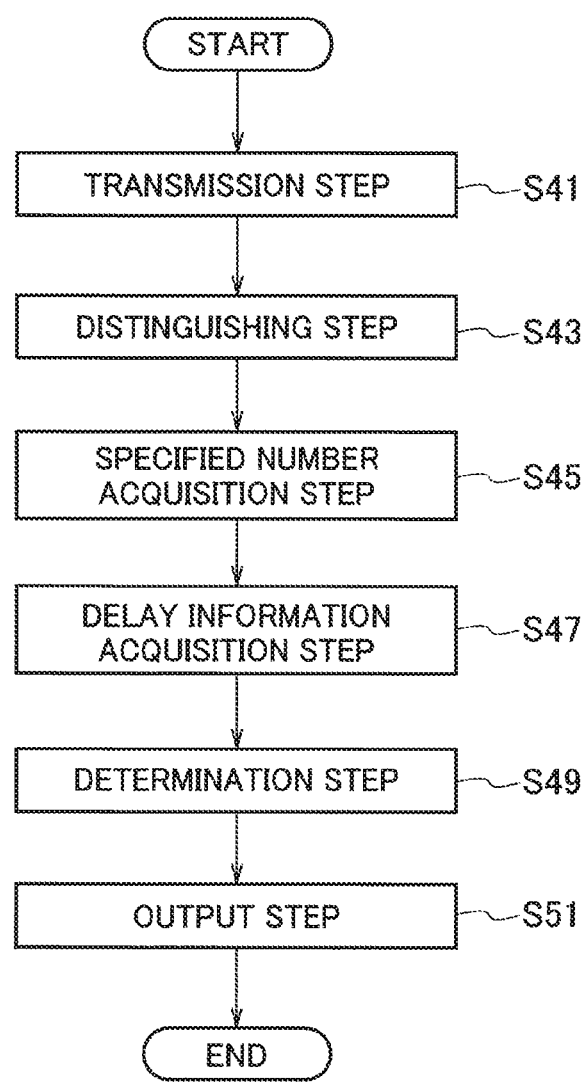
FIG. 6 is a flowchart illustrating a procedure of a network communication method performed when a plurality of loads is sequentially turned on in the in-vehicle LAN system of FIG. 1.

Next, a case where the desired loads 11 connected to each slave unit 7 are turned on at constant time intervals in the in-vehicle LAN system 1 of the embodiment will be described. In this case, a network communication method according to the procedure illustrated in the flowchart of FIG. 6 is performed.

First, a transmission step is performed (step S41). In the transmission step, the controller 51 of the master unit 5 transmits the command signal of FIG. 3A to the CXPI bus 3.

At this time, the controller 51 of the master unit 5 specifies the value of the turning-on interval of the loads 11 as the delay time length in the delay area of the command signal. In addition, the controller 51 specifies the ports 74-79 of each slave unit 7 in the output port specification area in the specified order corresponding to the turning-on order of the loads 11.

When the master unit 5 transmits the command signal to the CXPI bus 3, a distinguishing step is performed (step S43) following the transmission step of step S41.

In the distinguishing step, the microcomputer 71 of each slave unit 7 receives a command signal from the CXPI bus 3. If any of the ports 74-79 of the own slave unit 7 is specified as the instruction target in the output port specification area of the received command signal, a specified number acquisition step is performed (step S45) following the transmission step of step S41.

In the specified number acquisition step, in each slave unit 7, the microcomputer 71 acquires the specified number, in the specified order, of each of the ports 74-79 of the own slave unit 7 specified as the instruction targets in the output port specification area of the command signal.

When the microcomputer 71 of each slave unit 7 acquires the specified number of each of the ports 74-79 specified as the instruction targets in the output port specification area of the command signal in the specified order, a delay information acquisition step is performed (step S47) following the specified number acquisition step of step S45.

In the delay information acquisition step, the microcomputer 71 of each slave unit 7 acquires the specified value in the delay area of the command signal. When the microcomputer 71 acquires the specified value in the delay area of the command signal, a determination step is performed (step S49) following the delay information acquisition step of step S47.

In the determination step, the microcomputer 71 of each slave unit 7 calculates a delay time length from the reception of the command signal to output of an operation signal by integrating the specified value in the delay area of the command signal having been acquired in the delay information acquisition step of step S47. The number of times of the integration corresponds to the specified number (the specified number–1) of the port 74-79 specified as the instruction target having been acquired in the specified number acquisition step of step S45.

When the microcomputer 71 of each slave unit 7 calculates the delay time lengths of the ports 74-79 specified as the instruction targets, an output step is performed (step S51) following the determination step of step S49.

In the output step, the microcomputer 71 of each slave unit 7 outputs operation signals to the loads 11 at intervals specified as the delay time length specified in the delay area of the command signal from the ports 74-79 specified as the instruction targets in the output port specification area of the command signal in the specified order of the instruction targets. As a result, the loads 11 connected to the ports 74-79 specified as the instruction targets are sequentially turned on at the intervals that are specified values in the delay area of the command signal.

FIG. 7 is a timing chart illustrating variation of the potentials of the ports 74-79 in association with the output of operation signals at constant intervals specified as the delay time length from the ports 74-79 of each slave unit 7.

The timing chart of FIG. 7 illustrates a case where all the ports 74 to 79 of the first slave unit 7 (ID_1) and the ports 74 and 75 of the second slave unit 7 (ID_2) illustrated in FIG. 1 are specified as the instruction targets in this order in the output port specification area of the command signal of FIG. 3A.

Thus, the first slave unit 7 (ID_1) that has received the command signal transmitted from the master unit 5 to the CXPI bus 3 outputs a low active operation signal from the ports 74-79 specified first to sixth in the specified order sequentially to the loads 11 at timings with the delay time length specified in the delay area of the operation signal therebetween.

Also, the second slave unit 7 (ID_2) that has received the command signal transmitted from the master unit 5 to the CXPI bus 3 outputs a low active operation signal from the ports 74 and 75 specified seventh and eighth in the specified order sequentially to the loads 11 at timings with the delay time length specified in the delay area of the operation signal therebetween.

Here, the slave unit 7 including the port 79 specified sixth as the instruction target is different from the slave unit 7 including the port 74 specified seventh (the port 79 specified sixth in the specified order is included in the first slave unit 7 (ID_1) and the port 74 specified seventh in the specified order is included in the second slave unit 7 (ID_2)).

As described above, even if the two ports 79 and 74 of the two slave units 7 are specified successively as the instruction targets in the specified order, similarly to other two ports specified successively as the instruction targets in the specified orders such as ports 74 and 75, ports 75 and 76, ports 76 and 77, ports 77 and 78, and ports 78 and 79 within the same slave unit 7 as illustrated in FIG. 7, an operation signal is output at a timing delayed from the output timing of operation signals from the former ports 74-79 by the delay time length.

Next, a case where desired loads 11 connected to each slave unit 7 are sequentially turned on with individually set turning-on time differences between successive two loads 11 in the in-vehicle LAN system 1 of the embodiment is described. In this case, the master unit 5 first transmits the delay information signal of FIG. 3B and then transmits the command signal of FIG. 3A to the CXPI bus 3.

When transmitting the delay information signal, the master unit 5 specifies, in the individual delay areas of the delay information signal, differences (delay time lengths) between output timings of an operation signal between two ports 74-79 of each slave unit 7 specified successively as instruction targets in the output port specification area of the command signal in the order of specification of the instruction targets.

When transmitting the command signal, the master unit 5 specifies "0" in the delay area of the command signal to indicate that the value of the turning-on interval for each load 11 is specified in the delay information signal. The ports 74-79 of each slave unit 7 are specified in the specified order corresponding to the turning-on order of the loads 11 in the output port specification area similarly to the case of turning on the desired loads 11 at constant intervals.

When the master unit 5 transmits the delay information signal to the CXPI bus 3, each slave unit 7 receives the delay information signal from the CXPI bus 3. The master unit 5 then stores the specified value in each of the individual delay areas of the received delay information signal in the RAM of the microcomputer 71.

Thereafter, when the master unit 5 transmits a command signal to the CXPI bus 3, each slave unit 7 receives the command signal from the CXPI bus 3. When any of the ports 74-79 of the own slave unit 7 is specified as instruction target in the output port specification area of the received command signal and the specified value in the delay area of the command signal is "0", the microcomputer 71 calculates the delay time length from the reception of the command signal to output of the operation signal using the specified value in each individual delay area of the delay information signal stored in the RAM.

More specifically, the microcomputer 71 calculates the delay time length from the reception of the command signal to the output of the operation signal by integrating the specified values in the individual delay areas corresponding to two ports 74-79 specified successively that are former compared with the number of the instruction target in the output port specification area of the command signal out of the specified values in the individual delay areas of the delay information signal.

Thus, from the ports 74-79 specified as the instruction targets in the output port specification area of the command signal, operation signals for the loads 11 are output at intervals individually specified in the individual delay areas of the delay information signal in the specified order of the instruction targets. Therefore, the loads 11 connected to the ports 74-79 specified as the instruction targets are sequentially turned on at intervals individually specified in the individual delay areas of the delay information signal.

According to the in-vehicle LAN system 1 of the embodiment, the loads 11 can be sequentially turned on at different timings by outputting, to the ports 74-79 of the slave unit 7 to which the loads 11 are connected, only one command signal for causing operation signals to be output to the loads 11 without outputting a command signal at each timing for turning on corresponding one of the loads 11.

Therefore, even when the CXPI bus 3 having a relatively low communication speed (communication capacity) is used, it is possible to realize network communication capable of transmitting a command signal for sequentially operating the plurality of loads 11 from the master unit 5.

In addition, there is no need to define timings for outputting operation signals from the ports 74-79 of the slave unit 7, to which two loads 11 that are subsequently turned on are connected by defining time differences between the transmission timings of the command signals for the ports 74-79 to the CXPI bus 3.

Then, the output timings of the operation signals to two loads 11 that are to be turned on sequentially can be defined using the specified value specified in the delay area of the command signal that is transmitted to the CXPI bus 3 once, or the specified values specified in the individual delay areas of the delay information signal that is transmitted to the CXPI bus 3 once.

Therefore, even when the CXPI bus 3 having a relatively low communication speed (communication capacity) is used, it is possible to realize network communication capable of transmitting a command signal for sequentially operating the plurality of loads 11 with a short time difference from the master unit 5.

Note that the configuration in which prior to the command signal, the master unit 5 outputs the delay information signal to the CXPI bus 3 to allow individual specification of the timings at which operation signals are output to the loads 11 from the ports 74-79 of the slave unit 7 in the individual delay areas for pairs of loads 11 to be sequentially turned on is not essential.

In the embodiment, the case where the loads 11 are light sources that are turned on and off has been described. However, the present application is widely applicable to a case where a plurality of loads is sequentially operated at different timings.

In the embodiment, the case where the plurality of loads 11 connected to the respective ports 74-79 of the input/output interface 73 of the slave units 7 are sequentially operated at different timings across the plurality of slave units 7 has been described. However, the present application is also applicable to a case where a plurality of loads 11 connected to the respective ports 74-79 of the input/output interface 73 of one slave unit 7 are sequentially operated at different timings.

What is claimed is:

1. A network node, comprising:
   a distinguishing unit configured to distinguish whether or not an own output port is specified as an instruction target in a command signal received from a network;
   a specified number acquisition unit configured to acquire, from the command signal, a specified number in a specified order, in the command signal, of the own output port distinguished by the distinguishing unit as the instruction target specified in the command signal;
   a delay information acquisition unit configured to acquire delay information on a delay time length of an output timing of an operation signal for a load connected to the output port that is the instruction target from the command signal, in which the distinguishing unit has distinguished that the own output port is specified as the instruction target;

a determination unit configured to determine a timing at which the operation signal is output to the load from the own output port based on a reception timing of the command signal, in which the distinguishing unit has distinguished that the own output port is specified as the instruction target, from the network, the specified number acquired by the specified number acquisition unit, and the delay information acquired by the delay information acquisition unit; and an output unit configured to output the operation signal to the load from the own output port at the timing determined by the determination unit.

2. The network node according to claim 1, wherein the specified number acquisition unit acquires, from the command signal specifying a plurality of output ports including an output port of another network node as instruction targets, the specified number of the own output port in the specified order.

3. The network node according to claim 1, further comprising an individual information acquisition unit configured to acquire, from a delay information signal including identification information of the delay information in header information out of signals received from the network, individual delay information defining, as delay time lengths, differences between output timings of two output ports specified successively out of a plurality of output ports specified as instruction targets in the command signal in the specified order of the instruction targets, wherein the distinguishing unit uses a signal including identification information of the command signal in the header information received after the delay information signal from the network to distinguish whether or not the own output port is specified as an instruction target in the command signal, and in a case where the delay information acquired from the command signal by the delay information acquisition unit indicates reference of the individual delay information, the determination unit determines a timing at which the operation signal is output to the load from the own output port using, as the delay information acquired by the delay information acquisition unit, differences of output timings of the operation signals defined at specified numbers that are former compared with the specified number acquired by the specified number acquisition unit in the individual delay information acquired, by the individual information acquisition unit, from the delay information signal having been received from the network before the command signal.

4. A network communication system, comprising:

a master node configured to specify, as instruction targets, output ports to output operation signals to loads at different timings in an order from an output port having an earlier output timing of an operation signal and transmit a command signal to a network, the command signal including delay information related to delay time lengths of output timings of the operation signals to the loads connected to the output ports that are the instruction targets from the output ports; and a slave node configured to receive the command signal from the network, wherein the network node according to claim 1 is used as the slave node.

5. A network communication method, comprising:

a transmission step, performed by a master node, of transmitting a command signal to a network, the command signal including, in a frame, an instruction target field in which output ports to output operation signals to loads at different timings are specified as instruction targets in an order from an output port having an earlier output timing of an operation signal, and a delay information field in which delay information related to delay time lengths of output timings of the operation signals to the loads connected to the output ports that are the instruction targets from the output ports is set;

a distinguishing step, performed by a slave node, of distinguishing whether or not an own output port is specified as one of the instruction targets in the instruction target field of the command signal received from a network;

a specified number acquisition step, performed by the slave node, of acquiring a specified number in a specified order of the own output port in the instruction target field of the command signal, the own output port having been distinguished in the distinguishing step as an output port specified as one of the instruction targets in the instruction target field of the command signal;

a delay information acquisition step, performed by the slave node, of acquiring the delay information from the delay information field of the command signal for which it has been distinguished in the distinguishing step that the own output port is specified as one of the instruction targets;

a determination step, performed by the slave node, of determining a timing for outputting the operation signal to the load from the own output port based on reception timing, from the network, of the command signal for which it has been distinguished in the distinguishing step that the own output port is specified as one of the instruction targets, the specified number acquired in the specified number acquisition step, and the delay information acquired in the delay information acquisition step; and an output step, performed by the slave node, of outputting the operation signal to the load from the own output port at the timing determined in the determination step.

\* \* \* \* \*